(12) United States Patent
Hillhouse et al.

(10) Patent No.: US 8,046,952 B2
(45) Date of Patent: Nov. 1, 2011

(54) ROD TRIGGER GRIP/HOOK HOLDER

(76) Inventors: Darrell R. Hillhouse, Mountain Center, CA (US); John J. Jordan, Anza, CA (US)

( * ) Notice: Subject to any disclaimer, the term of this patent is extended or adjusted under 35 U.S.C. 154(b) by 222 days.

(21) Appl. No.: 12/030,051

(22) Filed: Feb. 12, 2008

(65) Prior Publication Data
US 2009/0199455 A1    Aug. 13, 2009

(51) Int. Cl.
*A01K 87/00*    (2006.01)
*A01K 87/08*    (2006.01)
*A01K 97/06*    (2006.01)

(52) U.S. Cl. ............... 43/25.2; 43/18.1 R; 43/20; 43/22; 43/25

(58) Field of Classification Search ............... 43/18.1 R, 43/20, 22, 25, 25.2
See application file for complete search history.

(56) References Cited

U.S. PATENT DOCUMENTS

| | | | |
|---|---|---|---|
| 285,630 A | 9/1883 | Kasschau | |
| 718,589 A | 1/1903 | Tredwell | |
| 756,364 A | 4/1904 | Hermance | |
| 802,027 A | 10/1905 | Bishop | |
| 894,571 A | 10/1906 | Galbraith | |
| 858,881 A | 7/1907 | Letterman | |
| 930,181 A | 8/1909 | Huffman | |
| 1,227,273 A | 5/1917 | King | |
| 1,331,312 A * | 2/1920 | Bartlett | 43/22 |
| 1,995,242 A * | 3/1935 | Clarke | 43/22 |
| 2,144,122 A | 1/1939 | Pflueger | |
| 2,186,515 A * | 1/1940 | Yuncker | 43/22 |
| 2,443,946 A | 6/1948 | Bozorth, Jr. | |
| 2,514,645 A * | 7/1950 | Jardine | 43/25.2 |
| 2,620,590 A | 12/1952 | Shaw | |
| 2,833,075 A * | 5/1958 | Herron | 43/25.2 |
| 2,929,579 A * | 3/1960 | Dell | 242/238 |
| 3,068,603 A | 12/1962 | Zeigler | |
| 3,281,981 A * | 11/1966 | Dykhouse | 43/25.2 |
| 3,410,016 A | 11/1968 | Arsenault | |
| 3,418,741 A * | 12/1968 | Tschoepe | 42/77 |
| 3,769,737 A * | 11/1973 | Miyamae | 242/273 |
| 4,190,977 A | 3/1980 | Casper | |
| 4,261,128 A * | 4/1981 | Dobbins | 43/21.2 |
| 4,457,095 A * | 7/1984 | Stevenson | 43/25.2 |
| 4,519,159 A | 5/1985 | Fazio | |
| 4,667,433 A * | 5/1987 | Thompson, Jr. | 43/25.2 |
| 4,697,377 A | 10/1987 | Martin | |
| 4,845,880 A * | 7/1989 | Miller | 43/19 |
| 5,025,585 A * | 6/1991 | Powell | 43/25 |
| D324,561 S | 3/1992 | Terry et al. | |
| 5,182,874 A * | 2/1993 | Powell | 43/25 |
| 5,956,884 A | 9/1999 | Goodrich | |
| 6,408,563 B1 * | 6/2002 | Van Scoy | 43/25.2 |
| D491,999 S | 6/2004 | Scott | |
| 6,848,209 B2 | 2/2005 | Ohmura | |
| 7,191,559 B1 | 3/2007 | Laceky | |

* cited by examiner

*Primary Examiner* — David Parsley
(74) *Attorney, Agent, or Firm* — Joseph E. Mueth

(57) ABSTRACT

In a fishing rod having a hand grip and a reel clamped to and held above the rod, the improvement wherein there is provided between the rod and the clamp on the underside of the rod a unitary piece having an elongate central section free of lateral protuberances which is laterally curved to essentially match the curvature of the fishing rod, aligned with the elongate central section at one end and integral therewith a curved finger grip terminating in a free distal end, and also aligned with the elongate central section at its opposite end and integral therewith a projection having an opening therein adapted to receive the hook portion of fishing hook.

4 Claims, 3 Drawing Sheets

ROD TRIGGER GRIP/HOOK HOLDER

BACKGROUND OF THE INVENTION

The typical fishing rod has a reel containing the fishing line. The fishing reel is attached to the top of the fishing rod, usually by a clamp. A hand grip is provided at the end of the fishing rod to the rear of the reel. In ocean fishing for large fish such as yellowtail tuna (40 to 80 pounds), the fisherman casts the hook and line and often has to wait for a protracted period for a bite. If the fisherman becomes distracted or otherwise loses concentration, he may cease holding the hand grip firmly so that when a large fish suddenly takes the hook, the line along with the entire rod and reel is suddenly jerked out of the fisherman's hand, resulting in the loss of the rod and reel to the ocean depths at a cost of hundreds of dollars.

In U.S. Pat. No. 756,364 to Hermance, there is disclosed an attached trigger shaped element for restraining the fisherman's finger and located behind the reel. Bishop U.S. Pat. No. 802,027, describes a trigger-shaped finger restraining structure attached to the fishing rod with the restraining structure located behind the reel. U.S. Pat. No. 4,697,377 to Martin shows a finger hole structure attached to a fishing rod and located behind the reel. U.S. Pat. No. 5,956,884 relates to a reel clamp and grip assembly which is attached by bolts to a reel plate to hold the reel and clamp to the fishing rod. The grip assembly has two laterally, outwardly opposed members each having bolt holes which are aligned with the bolts extending from the reel plate to permit attachment to the rod. Other patents of possible relevance include U.S. Pat. Nos. 2,620,590 and 7,191,559.

SUMMARY OF INVENTION

A unitary piece for clamping to a fishing rod below the reel between the reel clamp and the underside of the rod, said piece having an elongate central section free of lateral protuberances which is laterally curved to essentially match the curvature of the fishing rod, aligned with the elongate central section at one end and integral therewith a finger grip, and also aligned with the elongate central section at its opposite end a projection having an opening therein adapted to receive the hook portion of fishing hook.

In a fishing rod having a hand grip and a reel clamped to and held above the rod, the improvement wherein there is provided between the rod and the clamp on the underside of the rod a unitary piece having an elongate central section free of lateral protuberances which is laterally curved to essentially match the curvature of the fishing rod, aligned with the elongate central section at one end and integral therewith a curved finger grip terminating in a free distal end, and also aligned with the elongate central section at its opposite end and integral therewith a projection having an opening therein adapted to receive the hook portion of fishing hook.

DESCRIPTION OF PREFERRED EMBODIMENTS

Figure 1:
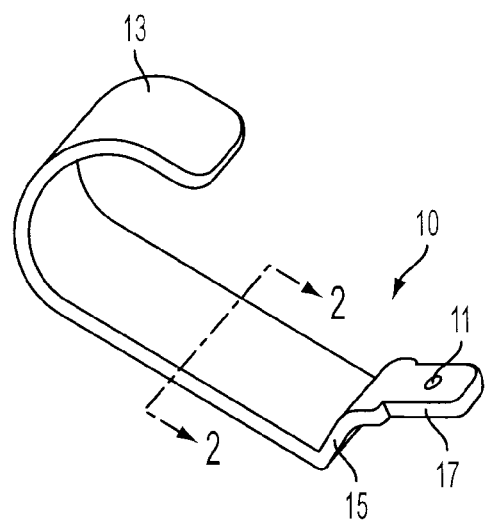
FIG. 1 shows in perspective view a single metal piece produced from stock by stamping and forming, taken from below when the piece is clamped to a fishing rod.
Figure 2:
FIG. 2 is a sectional view taken along line 2-2 in FIG. 1, showing the lateral curvature of the piece.
Figure 3:
FIG. 3 is a top plan view of the piece shown in FIG. 1.
Figure 4:
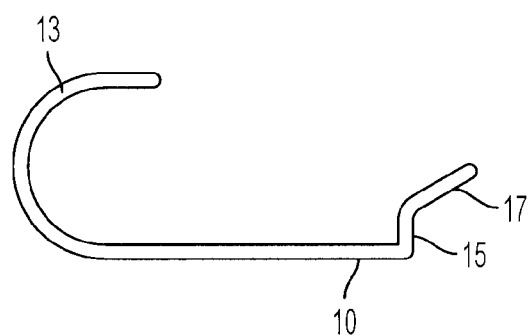
FIG. 4 is a side view of the piece shown in FIG. 1.
Figure 5:
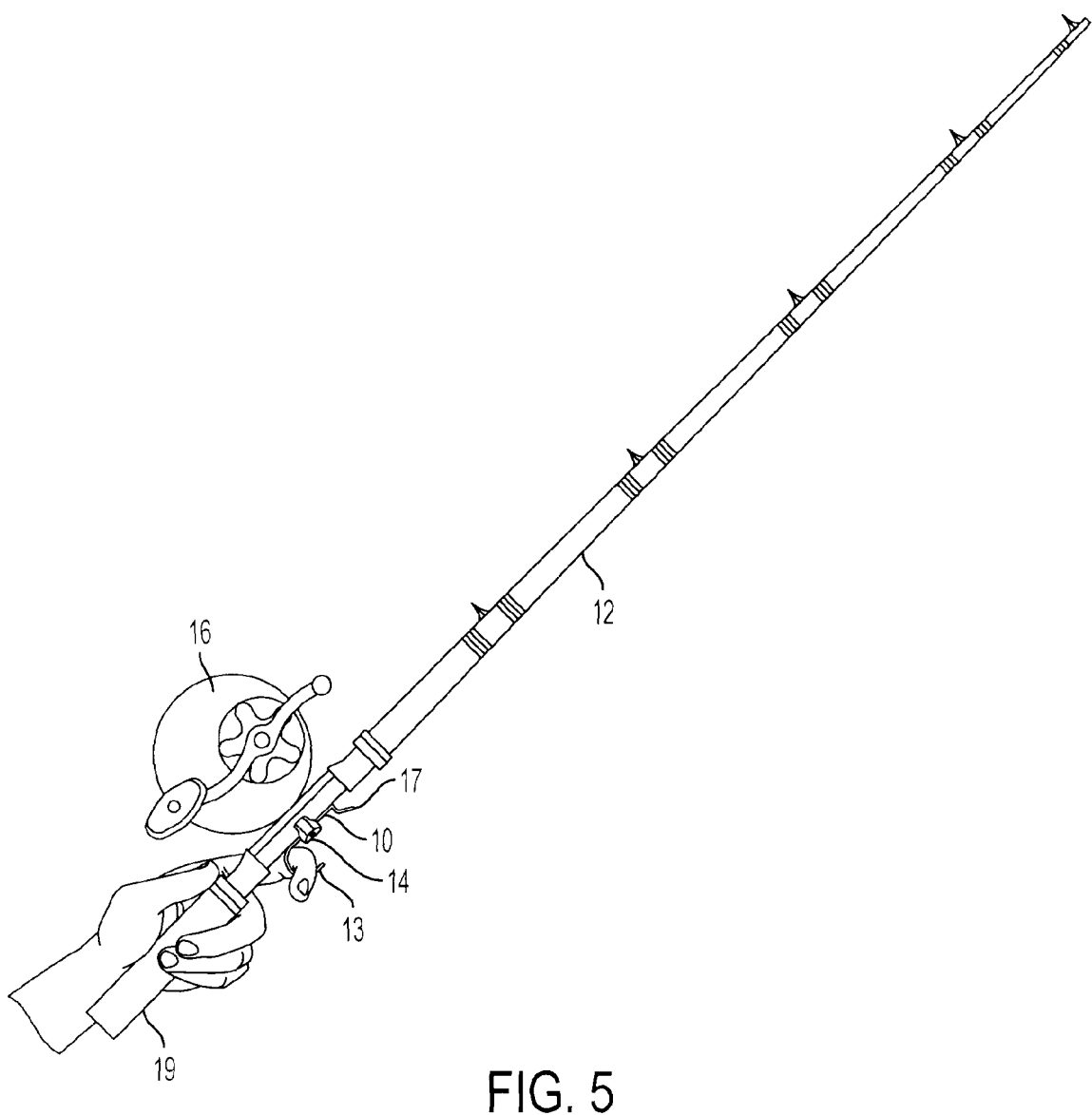
FIG. 5 is a side view showing the piece of FIGS. 1 to 4 clamped to a fishing rod equipped with a reel.
Figure 6:
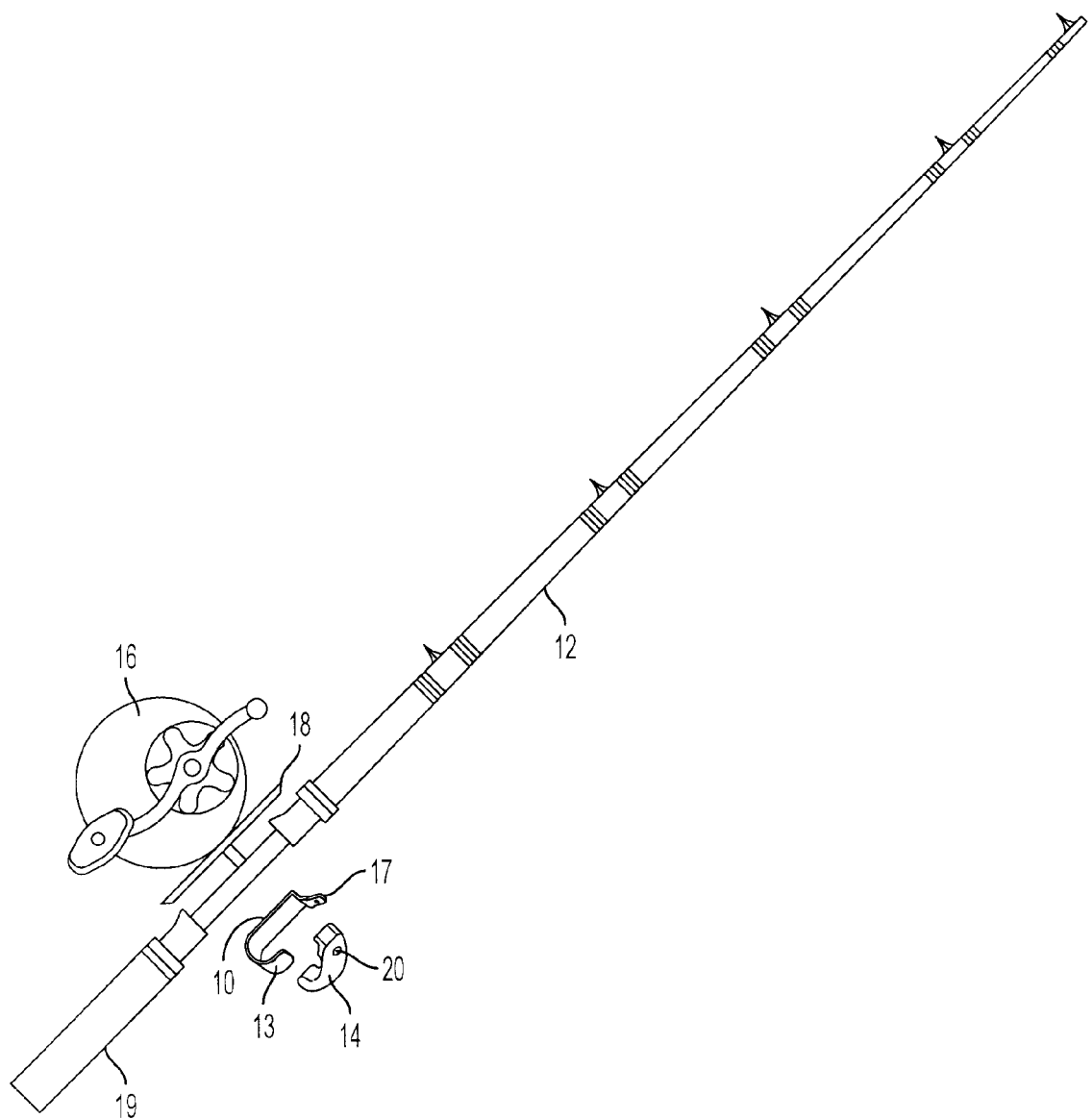
FIG. 6 is an exploded view showing the several elements of the rod and reel of FIG. 5 with the piece in position prior to completion of clamping of the piece to the rod.

Turning to the drawings in greater detail, the unitary piece 10 is preferably formed from a single length of metal stock which is cut, formed and punched to achieve the shape shown.

The piece 10 is preferably about 3½ inches lengthwise, about ½ inch wide in the wide area and about 5/16 inch wide at the one end which has an about 3/32 inch hole 11 to accommodate a fish hook. The piece 10 has rounded corners and is curved in the lateral dimension to match the curvature of a fishing rod. At the finger grip end 13, the curvature is at about a one inch diameter. At the opposite end, the piece 10 has a 90° bend for about ½ inch to form projection 15 and then terminates with a bend 17 at 120° where the 3/32 inch hole 11 to receive the fishing hook is provided. The central section of the piece which is free of lateral protuberances, is about 1¼ inches in length, that is, sufficiently long to be received and snugly held to the fishing rod 12 by reel clamps 14. The reel 16 holds the fishing line. The reel 16 has a reel plate 18 having bolt holes (not shown) which align with the holes 20 in clamp 14.

The piece 10 is positioned such that the finger grip 13 is readily accessible to the forefinger of the fisherman while his hand is wrapped around the hand grip 19. In this position, the fisherman can also control the play out of the line when casting by applying or releasing pressure to the line on the reel as it spins.

The piece 10 is adapted to be clamped between the existing reel, usually having a reel plate, and existing clamp as conventionally provided by fishing rod and reel manufacturers. Thus, unlike prior devices, the rod trigger grip and hook holder of this invention provide universal application since it is easily attached to all existing fishing rods provided with reel clamps, regardless of bolt spacing. The piece of this invention is also simpler to fabricate and has fewer points of stress concentration and, hence, is more resistant to failure, an important consideration in ocean fishing for large and powerful fish.

When the fishing rod is not in use, the fish hook at the end of the line can be passed through hole 11 for safekeeping. This provides for securing of the hook in a way which avoids accidental engagement with nearby objects and persons.

The invention claimed is:

1. A fishing rod having a hand grip and a reel clamped to and held above the rod by a reel clamp located below the rod, said rod having a smooth underside surface in proximity to said reel clamp, clamped between the rod and the reel clamp on the underside of the rod a unitary piece having an elongate central section free of lateral protuberances which is laterally curved to essentially match the curvature of the rod, said central section being of a length at least sufficient to be snugly slidable along the length of the rod and releasably received between the fishing rod and the reel clamp, aligned with the elongate central section at one end and integral therewith a curved finger grip terminating in a free distal end, wherein said finger grip is curved to provide a trigger-like shape aligned with the elongate central section, at its opposite end and integral therewith a projection, said projection extending from the central section at about a right angle, wherein said projection terminates with a further length extending at an oblique angle which contains a hole therein adapted to receive a fishing hook, said central section being adapted to be positioned along the underside of the rod independently of the reel and reel clamp whereby said unitary piece is adapted to be releasably and slidably positioned along the length of the rod such that said finger grip is readily accessible to the forefinger of a fisherman while the hand is wrapped around the hand grip.

2. The device of claim 1 wherein said finger grip is curved at about a one inch diameter.

3. A unitary piece for clamping to and in combination with a fishing rod, the fishing rod having a reel and reel clamp for holding the reel to the rod and a smooth underside surface below the reel between the reel clamp and the underside of the rod, said piece having an elongate central section free of lateral protuberances adapted to be clamped between said reel clamp and said underside of said rod, said elongate central section being laterally curved to essentially match the curvature of the fishing rod, said central section being of a length at least sufficient to be snugly slidable along the length of the rod and releasably received between the fishing rod and the fishing rod clamp which holds the reel to the rod, aligned with the elongate central section at one end and integral therewith a curved finger grip terminating in a free distal end, wherein said finger grip is curved to provide a trigger-like shape, aligned with the elongate central section, at its opposite end and integral therewith a projection, said projection extending from the central section at about a right angle, wherein said projection terminates with a further length extending at an oblique angle which contains a hole therein adapted to receive a fishing hook, said central section being adapted to be positioned along the underside of the rod independently of the reel and reel clamp whereby said unitary piece is adapted to be releasably and slidably positioned along the length of the rod such that said finger grip is readily accessible to the forefinger of a fisherman while the hand is wrapped around the hand grip.

4. The device of claim 3 wherein said finger grip is curved at about a one inch diameter.

* * * * *